(12) United States Patent
Kalliokulju

(10) Patent No.: US 7,054,954 B2
(45) Date of Patent: May 30, 2006

(54) DEFINING CONTEXT IDENTIFIER IN HEADER FIELD COMPRESSION

(75) Inventor: Juha Kalliokulju, Vesilahti (FI)

(73) Assignee: Nokia Mobile Phones, Ltd., Espoo (FI)

( * ) Notice: Subject to any disclaimer, the term of this patent is extended or adjusted under 35 U.S.C. 154(b) by 931 days.

(21) Appl. No.: 09/954,562

(22) Filed: Sep. 17, 2001

(65) Prior Publication Data

US 2002/0038385 A1    Mar. 28, 2002

(30) Foreign Application Priority Data

Sep. 22, 2000   (FI) ................................ 20002100

(51) Int. Cl.
    *G06F 15/16*   (2006.01)
(52) U.S. Cl. ........................................ 709/247
(58) Field of Classification Search ............... 709/247, 709/249; 369/4; 370/235
    See application file for complete search history.

(56) References Cited

U.S. PATENT DOCUMENTS 6,300,887 B1 * 10/2001 Le ............................. 341/60

OTHER PUBLICATIONS

Robust Header Compression Using Keyword-Packets, Miyazaki et al. Robust Header Compression (RoHC) WG 2000.*

"Robust Header Compression Using Keyword-Packets", Miyazaki et al., Robust Header Compression (RoHC) WG, 2000.
"IP Header Compression", Degermark et al., Internet Engineering Task Force, 1999.
I"Compressing IP/UDP/RTP Headers for Low-Speed Serial Links", Casner et al., Internet Engineering Task Force, 1999.
"Robust Header Compression (ROHC)", Burmeister et al., 2000.

* cited by examiner

*Primary Examiner*—Frantz B. Jean
(74) *Attorney, Agent, or Firm*—Perman & Green, LLP

(57) ABSTRACT

A method for defining a context identifier when compressing header fields of data packets, in which method, a context is defined for a compressor and decompressor of a data packet flow, the context controlling the operation of said compressor and decompressor. The context is identified by a context identifier attached to the data packet and the length of the context identifier is defined by data transfer between the compressor and decompressor in such a manner that the length of the context identifier is defined in the context identifier of the data packet being transmitted. The context identifier comprises a field of at least one bit for defining the length of the context identifier. The length of the context identifier can be defined in the context identifier of each data packet being transmitted.

12 Claims, 1 Drawing Sheet

| bit | 1 | 2 | 3 | 4 | 5 | 6 | 7 | 8 |
|---|---|---|---|---|---|---|---|---|
| byte 1 | CID_len | | CID | | | | | |
| byte 2 | PHI | | | | | | | |
| byte 3 | PHI/Payload | | | | | | | |
| ... | ... | | | | | | | |

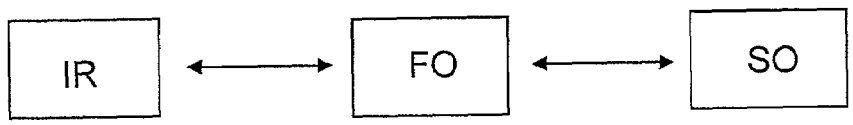
FIG. 1
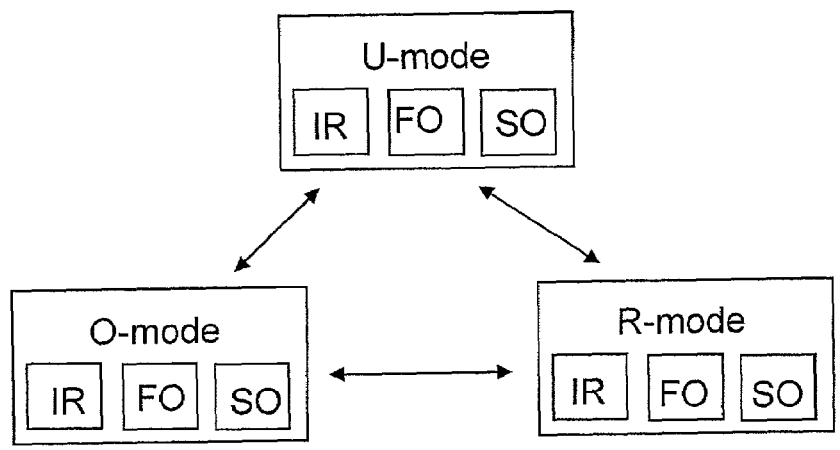
FIG. 2
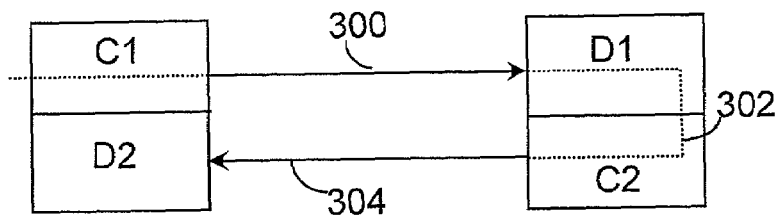
FIG. 3
| bit    | 1   | 2     | 3 | 4 | 5     | 6      | 7 | 8 |
|--------|-----|-------|---|---|-------|--------|---|---|
| byte 1 | CID_len |   | CID |   |       |        |   |   |
| byte 2 | PHI |       |   |   |       |        |   |   |
| byte 3 | PHI/Payload |   |   |   |   |   |   |   |
| ...    | ... |       |   |   |       |        |   |   |
FIG. 4

DEFINING CONTEXT IDENTIFIER IN HEADER FIELD COMPRESSION

BACKGROUND OF THE INVENTION

The invention relates to defining a context identifier when compressing header fields of data packets.

The rapid progress in IP (Internet Protocol) technology during the last few years has also expanded the potential of using different IP-based applications outside the conventional Internet data transfer. IP-based telephony applications in particular have developed at a fast pace, as a result of which an ever expanding part of the call transmission path even in conventional telephone networks (PSTN/ISDN, Public Switched Telephone Network/Integrated Services Digital Network) and mobile networks (PLMN, Public Land Mobile Network) can, in principle, be implemented by utilising IP technology.

Especially in mobile networks, IP technology offers many advantages, since in addition to the conventional voice services of mobile networks, which could be provided by means of various IP voice applications, mobile networks will provide more and more different data services, such as Internet browsing, e-mail services, games, etc., which are typically most preferably implemented as packet-switched IP-based services. This way, IP layers arranged in mobile system protocols could serve both audio/video services and various data services.

In mobile networks, it is especially important to utilise the limited radio resources as efficiently as possible. This, for its part, complicates the utilisation of the IP protocols in the radio interface, because in IP-based protocols, the proportion of various header fields of the transferred data is very large, and correspondingly, the proportion of payload is small. In addition, the bit error rate (BER) of the radio interface and the combined round-trip time (RTT) of the uplink and downlink directions may in bad conditions increase a great deal, which causes problems in most known header field compression methods. This has created a need to develop a header field compression method suitable for different IP protocols, which would be especially suited for data transfer over the radio interface: efficient header field compression which can, however, be used in conditions in which bit error rates and round-trip times increase a great deal.

For this purpose, IETF (Internet Engineering Task Force) has lately been working on the standardisation of a header field compression method known as ROHC (Robust Header Compression). One idea behind the development of ROHC is that there is a great deal of redundancy between the several IP header fields used in data packet transfer, not only inside the data packet, but also between them. In other words, a large amount of the information in the header fields does not change at all during the transfer of the data packets and is thus easy to reconstruct even though it is not transmitted. Only a small part of the header fields are such that the information they comprise requires attention during compression. Further, ROHC comprises several compression levels, whereby the efficiency of the compression increases when moving on a higher level. ROHC always tries to use the most efficient compression possible, in such a manner, however, that before moving on to the next level, a sufficient reliability of operation of the level is always ensured. ROHC also has the typical characteristic that it leaves several matters essential for the use of a compression method to be handled by the lower link layer.

One such matter to be negotiated through the lower link layer between a sender and a receiver, i.e. compressor and decompressor, is the definition of the length of a context identifier (CID) used on a certain radio link. The context identifier CID is used to distinguish from each other several packet data flows transmitted on the same radio link. The length of the context identifier CID can be 0, 1 or 2 bytes (0, 8 or 16 bits), and the value zero is used when the link only has one data flow. The length of CID is thus negotiated before the compression of the data to be transmitted is started, and the negotiated length of the context identifier CID is used thereafter in both the uplink and downlink direction.

One problem in the arrangement described above is the inflexibility of the length of the context identifier CID. Since the length of CID has been negotiated before starting compression, its value can only be changed by re-negotiating it between the compressor and decompressor, in which case the compression must be stopped. Another problem is that when using one radio bearer, the same CID length must be used both in the uplink and downlink direction. However, in mobile systems, for instance, a preferable CID length in the uplink direction is typically considerably shorter than in the downlink direction. If in a prior art solution, the CID length is defined for a radio bearer on the basis of the downlink direction requirement, the uplink direction radio resources are then not used optimally. If the CID length is defined taking into consideration the uplink direction only, problems will arise in the downlink direction decompression, because the required CID length is longer than the negotiated CID length.

BRIEF DESCRIPTION OF THE INVENTION

It is thus an object of the invention to develop a method and an apparatus implementing the method so as to solve the above-mentioned problems. The object of the invention is achieved by a method and system, which are characterized by what is stated in the independent claims. Preferred embodiments of the invention are set forth in the dependent claims.

The invention is based on the idea that when a need is detected to define a context identifier length for a data packet flow, typically as a re-definition, this definition is attached to the next data packet being transmitted, preferably to its context identifier field, where the new length of the context identifier is defined by one or more bits. According to a preferred embodiment of the invention, this definition is attached to each data packet being transmitted, whereby the length of the context identifier is checked from each data packet. According to a second preferred embodiment of the invention, this definition is only attached to the first data packet being transmitted, after which this context identifier length is used on the data packet flow until it is again correspondingly re-defined.

The method and system of the invention provide the advantage that the length of the context identifier can be defined to be different for the uplink and downlink directions, thus making the use of the data transfer resources more efficient. Further, the method of the invention provides the advantage that it is not necessary to stop the compression and decompression and to re-negotiate the context identifier length each time the length needs to be changed. A yet further advantage of the invention is that it also makes possible to multiplex data packets having different context identifier lengths to the same data transfer connection.

BRIEF DESCRIPTION OF THE FIGURES

In the following, the invention will be described in greater detail by means of preferred embodiments, with reference to the appended drawings, in which FIG. 1 is a block diagram of moving between different compression levels of ROHC, FIG. 2 is a block diagram of moving between different compression modes of ROHC, FIG. 3 is a block diagram of a problem situation caused by a prior art ROHC with different lengths of a context identifier field in the forward and return channels, and FIG. 4 shows a data packet comprising a context identifier field of a preferred embodiment of the invention.

DETAILED DESCRIPTION OF THE INVENTION

In the following, the implementation of the header field compression method ROHC in question is described for the parts essential for the invention. For a more detailed description of the compression method in question, reference is made to a yet unfinished Internet draft "Robust Header Compression (ROHC)", version 02, 18 Sep. 2000.

In different compression methods, a context is typically defined for both a compressor and a decompressor, the context being a state which the compressor uses to compress the header field to be transmitted and the decompressor uses to decompress a received header field. Typically, the context comprises an uncompressed version of the previous header field transmitted (compressor) or received (decompressor) over a data transfer connection. In addition, the context can comprise information identifying a data packet flow, such as sequence numbers or time stamps of data packets. Thus, the context typically comprises both static information, which remains the same for the entire data packet flow, and dynamic information, which changes during the data packet flow, but often does it according to a defined pattern.

ROHC uses three compression levels in such a manner that the compression is started on the lowest level and continues gradually to the higher levels. The basic principle is that compression is always performed on the highest possible level, in such a manner, however, that the compressor has sufficient certainty of the fact that the decompressor has enough information to perform decompression on the level in question. Factors affecting the move between different compression levels are variation in consecutive header fields, positive and negative acknowledgements received from the decompressor, and when there are no acknowledgements, the expiration of specific sequential counters. It is possible to move correspondingly to a lower level from a higher compression level.

The compression levels ROHC uses in connection with IP (Internet Protocol), UDP (User Datagram Protocol) and RTP (Real-Time Protocol) protocols are initiation/refresh (IR), first order (FO), and second order (SO), and moving between these levels is described in the diagram of FIG. 1. The IR level is used to create the context for the decompressor or to recover from an error situation. The compressor moves to the IR level when header field compression is started, requested by the decompressor, or when an update timer expires. On the IR level, the compressor sends IR header fields in an uncompressed format. The compressor tries to move to a higher level when it is certain that the decompressor has received the update information.

The FO level is used to inform the recipient of irregularities in the header fields of the data packet flow. After the IR level, the compressor operates on the FO level in a situation where the header fields do not form a uniform pattern (in other words, consecutive header fields change randomly in such a manner that the changes cannot be predicted) or the compressor cannot be certain that the decompressor has received the parameters defining the uniform pattern of the header fields. This is a typical situation when transmitting speech, for instance. On the FO level, the compressor sends compressed FO header fields. The compressor again tries to move to a higher level if the header fields form a uniform pattern and it is certain that the decompressor has received the parameters defining the uniform pattern. The FO-level data packets comprise typically context update information, which means that a successful decompression also requires a successful transmission of consecutive FO header fields. Thus, the success of the decompression process is sensitive to lost or damaged FO-level packets.

On the SO level, compression is optimal. The header fields form a uniform pattern which the compressor depicts with compressed SO header fields which, in practice, are sequence numbers of the data packets. Information is transmitted to the decompressor on parameters defining the uniform pattern of the header fields, and on the basis of the parameters and the received sequence number, the decompressor can extrapolate the original header fields. Because the data packets sent on the SO level are, in practice, independent of each other, the error sensitivity of decompression is also low. When the header fields no longer form a uniform pattern, the compressor moves back to the FO level.

Decompression also has three levels which are bound to the context definition of the decompressor. The decompressor always starts its operation from the lowest level when no context has yet been defined (No Context). The decompressor has then not yet decompressed any data packets. When the decompressor has decompressed the first data packet which comprises both static and dynamic context information, it can move over the middle level (Static Context) straight to the top level (Full Context). As a result of several error situations on the top level, the decompressor moves to the middle level, but typically even one successfully decompressed data packet returns the decompressor to the top level.

In addition to different compression levels, ROHC has three different operational modes: unidirectional mode (U mode), bi-directional optimistic mode (O mode), and bi-directional reliable mode (R mode), which are shown in the diagram of FIG. 2. According to FIG. 2, each compression level (IR, FO, SO) described above functions in each mode, but each mode functions in its own way on each level and also makes decisions on moving between levels in its own way. The selection of the mode for each compression situation depends on the parameters of the used data transfer connection, such as the possibility to use a return channel, error probabilities and distribution, effects of variation in the size of the header fields.

In the unidirectional mode, data packets are transmitted from compressor to decompressor only, so the U mode of ROHC is useful in situations where the use of a return channel is not possible or desirable. In the U mode, moving between different compression levels is done as a result of the expiration of certain sequential counters or on the basis of variation in the header field patterns. Because no return channel is used, compression in the U mode is less efficient and the disappearance of data packets on the transmission path more probable than in either of the bi-directional modes. Using ROHC is always started in the U mode and moving to either of the bi-directional modes can take place when the decompressor has received at least one packet and as a response to the packet, the decompressor indicates that a mode change is necessary.

The bi-directional optimistic mode is similar to the uni-directional mode with the exception that in the O mode, a return channel is used to correct error situations and to acknowledge significant context updates from the decompressor to the compressor. Sequential updates are not made in the O mode. The O mode is preferably suited for connections which require optimal compression efficiency with a small return channel traffic. The O mode provides a reasonably reliable data packet transfer, in which the synchronisation between the compressor and decompressor can typically be maintained well and data packets are seldom lost and if they are, in negligible numbers. At very high bit error rates, data packets can, however, be lost on the transmission path.

The bi-directional reliable mode differs clearly from the above-mentioned modes. The R mode uses a return channel to acknowledge all context updates, also to acknowledge sequence number updates. Thus in the R mode, data packets can nearly entirely reliably be transmitted between the compressor and decompressor. Compressing header fields cannot cause the disappearance of data packets in the R mode. A drawback of the R mode is that the size of the header field is in some cases slightly larger than in the above-mentioned modes and that the return channel traffic increases considerably.

The three operational modes and three compression levels of ROHC form different operating situations for the compression of the header fields, each situation requiring the definition of the operation of the compressor and decompressor and the transmission of packets between them. ROHC uses different packets in different operating situations. At the moment, six different data packet types are defined for ROHC, four of which are used for transmission from the compressor to the decompressor and two as return channel data packets from the decompressor to the compressor. The number of used data packet types may change in the future, but all data packet types are characterized in that a context identifier CID defining the context used at each time is attached to the beginning of each data packet before sending the packet to the transmission path.

The length of the context identifier CID is negotiated separately for each data packet flow by the compressor and decompressor. According to the ROHC definitions, the lower protocol layer (link layer) used at each time must provide a mechanism for the negotiation of the parameters, such as the length of the context identifier, used in compressing the header fields. The parameters are negotiated before starting the compression and, in this connection the length of the context identifier of the data packet flow can, according to prior art, be defined to be 0, 8 or 16 bits. On one logical data transfer channel, it is possible to transmit simultaneously several data packet flows whose contexts are identified and distinguished from each other by means of the context identifier CID. If only one data packet flow is transmitted on the channel, which is typical of different VoIP applications (Voice over IP), for instance, the length of the context identifier CID is given the value 0. When transmitting several data packet flows on the same channel, the length of the context identifier is defined at 8 or 16 bits for each data packet flow depending on the used application, data transfer protocol and channel conditions.

The length of the context identifier CID negotiated in the bi-directional operational modes (O mode and R mode) described above is also used on the return channel. However, in mobile systems, for instance, it would often be preferable to use a longer context identifier on the return channel (downlink) than on the forward channel (uplink), because especially in using packet data services, much more data is transferred in the downlink direction than in the uplink direction. Then, when using header field compression according to ROHC, the length of the context identifier must typically be dimensioned according to the return channel requirements, in which case the forward channel from the compressor to the decompressor is utilised inefficiently.

The block diagram of FIG. 3 describes a problem which would arise, if in the present ROHC method, an 8-bit context identifier was defined for the forward channel and a 16-bit context identifier for the return channel. For instance in mobile systems, the uplink and downlink channels have their own compressor-decompressor pairs in such a manner that the terminal, for instance, has a compressor C1, and in the uplink direction on the network side, there is a decompressor D1. Correspondingly, in the downlink direction on the network side, there is a compressor C2 which has its counterpart, a decompressor D2, in the terminal. Thus, the compressor C1 sends data packets (300) comprising an 8-bit context identifier on the uplink channel to the decompressor D1. At some stage, for instance when changing the compression level, the network decompressor D1 sends an acknowledgement to the terminal on the downlink channel, which acknowledgement occurs by transferring the data packet to the compressor C2 (302) which adds the 8-bit context identifier to the acknowledgement, because both channels must according to the present ROHC definitions use the same context identifier length. The compressor C2 attaches this acknowledgement packet to the data flow (304) being transferred to the terminal on the downlink channel. The decompressor D2 checks said acknowledgement packet, but because the decompressor is expecting data packets having a 16-bit context identifier, it interprets the first byte of the header field of the data packet following the 8-bit context identifier field as part of the context identifier CID, which causes an error situation either in the interpretation of said acknowledgement packet or in its decompression.

The above problem could, in principle, be avoided in the prior art method by interrupting the compression each time when an acknowledgement arrives from the decompressor on the return channel and by re-negotiating the length of the context identifier of the forward channel. This would, however, slow down the data flow transfer so much that utilising ROHC would, in practice, become impossible in several applications. In practice, the solution would be to interrupt the compression and to negotiate a 16-bit context identifier field for both directions, which would again result in not utilising the data transfer resources optimally.

The problems described above can now be avoided according to the method of the invention, which defines the length of the context identifier in the context identifier field of a data packet in response to the fact that the length of the context identifier must be changed. This can preferably be done by reserving one or more bits of the context identifier field to indicate the length of the context identifier of the data packet, and the actual context identifier can preferably be added after these bits. The length of the context identifier can thus be preferably defined separately for each data packet, in which case each data packet in a data packet flow, and especially their context identifier fields, comprises information defining the length. This method, in which information defining the context identifier length is attached to each data packet, preferably to the first bits of its context identifier field, ensures that the new context identifier is transmitted to the receiver. Alternatively, the length of the context identifier can also be defined in the above manner so that only the first data packet being transmitted after the re-definition of the context identifier length comprises said information defining the length, but this is not as reliable a method to transmit the new context identifier length to the decompressor.

The definition of the context identifier length is illustrated in the table of FIG. 4, which by way of example shows a data packet comprising a context identifier field structure of the invention. A context identifier field (CID) is, according to ROHC, attached to the beginning of the data packet as the first byte, which is followed by the packet header information field (PHI) of the data packet and the payload of the data packet. However, the context identifier field also comprises substantially in each data packet a field which defines the length (CID_len) of the context identifier of the data packet in question. In the example of FIG. 4, the length of the field defining the length is two bits, but it can preferably vary between 1 and 8 bits. The length of the context identifier for the data packet in question is thus determined by the information in the field indicating the context identifier length, and the length information in the next data packet re-defines the length of the context identifier again for the data packet in question. The actual context identifier (CID) may comprise several bytes, even more than two, if necessary.

This way, the method of the invention makes it possible to define different context identifier lengths for the forward and return channels, which makes the use of the data transfer resources more efficient. Further, stopping the compression and decompression and re-negotiating the context identifier length each time that the length needs to be changed can be avoided with the method of the invention. The method of the invention also makes it possible to multiplex data packets having different lengths of context identifier to the same data transfer connection.

The method described above can preferably be applied for instance to third-generation mobile systems called UMTS (Universal Mobile Telecommunication System) and IMT-2000 (International Mobile Telephone System), and in the further development projects of the second-generation mobile systems, such as GERAN (GSM Edge Radio Access Network). For instance, in the packet data service of the UMTS system, one of the parameters defining the radio bearer is the compression method of data packet header fields used by the terminal. Compressing the header fields of data packets to be transmitted and decompressing received data packets is in the UMTS system performed on the packet data convergence protocol PDCP layer belonging to the packet data protocol. The tasks of the PDCP layer include functions related to improving channel efficiency, which are typically based on different optimisation methods, such as the utilisation of compression algorithms of data packet header fields. Because currently the network-level protocols designed for UMTS are IP protocols, the compression algorithms used are those standardised by IETF (Internet Engineering Task Force). Thus, the ROHC compression method is especially well-suited for the UMTS system. The PDCP layer of the terminal typically supports several header field compression methods so as to allow connection establishment with as many network-level protocol types as possible.

The data quantities transferred in the uplink and downlink directions in applications used in the packet data service of the UMTS system in particular typically differ considerably from each other so that considerably more data is transferred in the downlink direction than in the uplink direction. Thus, the arrangement of the invention, in which the context identifier can be defined to be longer in the downlink direction than in the uplink direction, improves the use of radio resources in the UMTS system.

It is obvious to a person skilled in the art that while technology advances, the basic idea of the invention can be implemented in many different ways. The invention and its embodiments are thus not restricted to the examples described above, but can vary within the scope of the claims.

What is claimed is:

1. A method for defining a context identifier when compressing header fields of data packets, the method comprising:
    defining a context for a compressor and decompressor of a data packet flow, the context controlling the operation of the compressor and the decompressor,
    identifying the context by a context identifier attached to the data packet
    defining the length of the context identifier in the context identifier of the data packet being transmitted between the compressor and decompressor, and
    including a length definition of said context identifier as a part of a context identifier field of the data packet being transmitted.

2. A method as claimed in claim 1, wherein the context identifier comprises a field of at least one bit for defining the length of the context identifier.

3. A method as claimed in claim 1, wherein the length of the context identifier is defined in each transmitted context identifier of the data packet.

4. A method as claimed in claim 1, wherein the length of the context identifier is defined only in the context identifier of the data packet transmitted first.

5. A method as claimed in claim 1, further comprising defining a different length for the context identifier of the data packet flow transferred from the compressor to the decompressor than for the context identifier of the data packet flow transferred from the decompressor to the compressor.

6. A method as claimed in claim 1, further comprising performing said header field compression according to the ROHC definition.

7. A method as claimed in claim 1, further comprising performing said header field compression on the radio interface of a mobile system, such as the UMTS system.

8. A compression system for compressing header fields of data packets, which system comprises a compressor for compressing a data packet flow being transmitted and a decompressor for decompressing a data packet flow being received,
    wherein the compressor and the decompressor of the data packet flow are configured to be defined by a context, by means of which context the operation of the compressor and decompressor is controlled, and the context is configured to be identified by a context identifier attached to a data packet,
    the length of the context identifier is configured to be defined in the context identifier of the data packet being transmitted between the compressor and the decompressor, and a length definition of said context identifier is arranged to be included within a context identifier field of the data packet being transmitted.

9. A system as claimed in claim 8, wherein the context identifier comprises a field of at least one bit for defining the length of the context identifier.

10. A system as claimed in claim 8, wherein the length of the context identifier is configured to be defined in the context identifier of each data packet being transmitted.

11. A network element (RNC) for a mobile communication system comprising a header field compression system including a compressor and a decompressor, the header field compression system being arranged to:
   define a context for a data packet connection between the compressor and the decompressor as one parameter of the connection, the context controlling operation of said compressor and said decompressor and comprising a context identifier to identify data packet connections,
   define a length for the context identifier for data transmission between the compressor and the decompressor, and
   wherein said network element is arranged to include a length definition of said context identifier as a part of a context identifier field of the data packet being transmitted.

12. A mobile station for a mobile communication system comprising a header field compression system including a compressor and a decompressor, the header field compression system being arranged to:
   define a context for a data packet connection between the compressor and the decompressor as one parameter of the connection, the context controlling operation of said compressor and said decompressor and comprising a context identifier to identify data packet connections,
   define a length for the context identifier for data transmission between the compressor and the decompressor, and
   wherein said mobile station is arranged to include a length definition of said context identifier as a part of a context identifier field of a data packet being transmitted.

* * * * *